Figure 1:
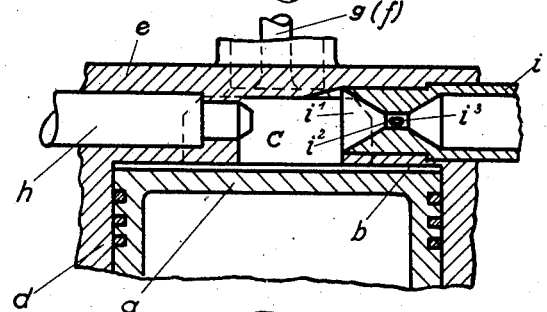

April 10, 1934.  F. LANG  1,954,083

COMBUSTION CHAMBER FOR DIESEL ENGINES

Filed Feb. 20, 1932

Inventor:
Franz Lang
by Attorney.

Patented Apr. 10, 1934

1,954,083

UNITED STATES PATENT OFFICE

1,954,083

COMBUSTION CHAMBER FOR DIESEL ENGINES

Franz Lang, Munich, Germany, assignor to Lanova Aktiengesellschaft, Vaduz, Liechtenstein Application February 20, 1932, Serial No. 594,286

1 Claim. (Cl. 123—32)

Known are Diesel engines and especially so air chamber internal combustion engines, which have air chambers with several exits. In these engines a part of the injected fuel gets into the air chamber, because the nozzle points towards the air chamber.

On account of the ignition a burning of the fuel mixture in the air chamber takes place.

To which extent this burning goes and how much of the air contents in the air chamber are consumed, the opinions of experts differ.

It has been shown through experiments that it is possible to more advantageously work an internal combustion engine if the extent of the combustion in the air chamber is enlarged.

In order to achieve this end it is necessary that a proportionally large part of the injected fuel gets into the air chamber and burns explosion like.

This causes a tremendous pressure rise in the air chamber and with this or through this a very strong increase in the blowing power of the air chamber.

Such high air chamber pressures are most necessary, especially for such Diesel or internal combustion engines where the contents of the combustion chamber have to be moved in a certain willed direction.

I propose this arrangement not alone because the contents of the combustion chamber receive a greater velocity but also for reason of a new function for air chambers being created. This function consists of the transfer of the tremendous pressure created in the air chamber from this air chamber into the combustion chamber and therefore on the piston head. It is like an external combustion, which creates and piles up energy just like in a steam boiler.

Due to the high pressure generated in the air chamber and thence in the combustion chamber, the working pressure on the piston head is greatly increased over that which obtains when the charge of fuel mixture in the combustion chamber is initially ignited, just like in a steam engine in which the pressure in the main boiler is transferred during the filling period to the piston. For reason of this it can be said that the air chamber through our process becomes an energy storage chamber.

In reference to that share of air in the air chamber, which the explosion needs for proper combustion, this varies with various internal combustion engines. Under normal load the amount of air which is consumed in the air chamber for the combustion could be up to 30% and more.

It has been shown through tests that such engines possess the peculiarity that the blowout energy of the air chamber adapts itself automatically to the load and to the number of revolutions of such engines.

The pressure generated in the air chamber by the combustion of the charge of fuel mixture stored therein, depends upon the amount of fuel which enters this chamber. When the load is increased the total amount of fuel injected is also increased, with a proportionate increase in the amount of fuel which enters the air or air and fuel storage chamber, so that the pressure in this chamber incident to explosion or combustion of the fuel charge therein is correspondingly increased. The burning fuel mixture and air are ejected from the storage chamber and increase the pressure in the cylinder, which pressure acts on the piston, in much the same manner as the pressure in the cylinder of a steam engine increases during admission of steam to the cylinder. For example, if it be assumed that the pressure in the combustion chamber is 38 atmospheres and the pressure in the storage chamber is 75 atmospheres, when the combustible charges in the two chambers are first ignited, the pressure in the combustion chamber may increase to approximately 40 or 41 atmospheres, due to ejection from the storage chamber of the burning mixture and air under relatively high pressure into the combustion chamber. If the load on the engine increases, with a corresponding increase in fuel injected, the pressure generated in the storage chamber will be increased resulting in an increase in pressure within the cylinder, as above set forth. Since the load and the speed of operation of the engine are functions of each other, and the injection of fuel varies in accordance therewith, these three factors cooperate to produce a continuous and automatic regulation of fuel injection and the resulting pressure acting upon the piston, in accordance with requirements.

This new function of the air chamber makes it necessary, especially for engines of large dimensions to make new contraptions or devices to help the flow of the compressed air as well as the fuel and mixture into the chamber and vice versa from the air chamber again to the combustion chamber.

A small entrance room for example would be sufficient for the entrance of the necessary fuel as well as air and mixture into the air chamber to create such high pressures, by the explosion of the fuel.

In order now to even up the high pressure from the air chamber to the combustion chamber and to lead the high compressed contents of the air chamber from the air chamber to the combustion chamber without being unduly throttled it is necessary to construct several channels alongside of the main exit through which on the other hand no doubt some compressed air will go into the air chamber as well as some fuel or fuel mixture.

Figure 2:
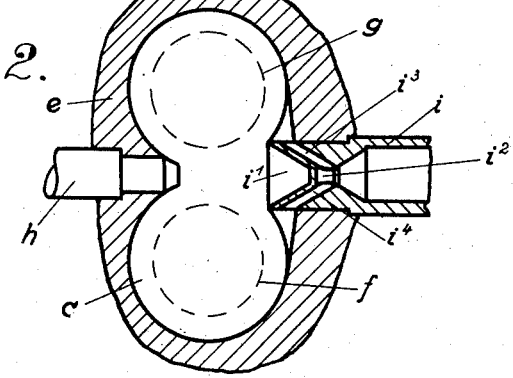

In the drawing attached the Figs. 1 and 2 show such a portion of an internal combustion engine in a vertical and horizontal section.

Figure 3:
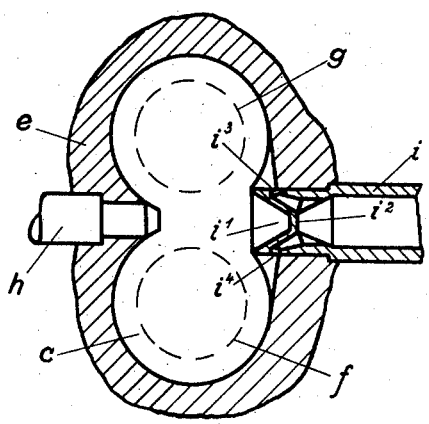
Figure 4:
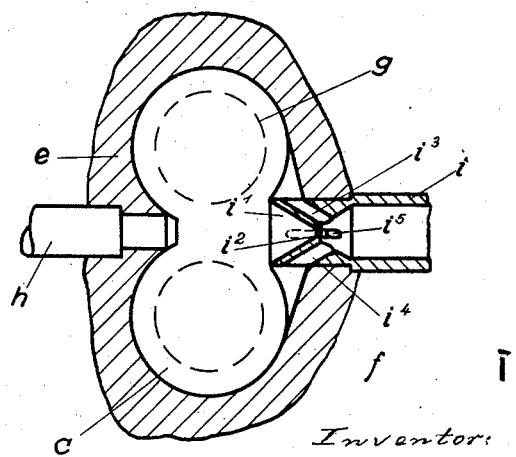

Figs. 3 and 4 show two further possibilities for the use of the invention in a horizontal section.

In the drawing $a$ is the piston, $b$ is the combustion room between the piston head in dead center position and the main combustion chamber and $c$ is the main combustion chamber and $d$ is the cylinder and $e$ is the cylinder head and $f$ is the inlet valve and $g$ is the outlet valve.

The nozzle $h$ projects into the main combustion chamber $c$ and the air chamber $i$ is opposite the nozzle $h$ and connects directly with the main combustion chamber $c$. The horizontal section of the main combustion chamber is of a generally elliptical shape, being more specifically of approximately a heart or kidney or figure 8 shape.

According to Figs. 1 and 2 the air chamber $i$ has a small anteroom or channel $i^1$ of conical shape, which serves as an entrance for the necessary fuel as well as air and mixture.

The connection or throttling space $i^2$ lays between the ante-room $i^1$ and the air chamber $i$.

Two channels $i^3$ and $i^4$ connect the throttling space $i^2$ with the main chamber $c$. These channels $i^3$ and $i^4$ each lay on each side of the anteroom $i^1$.

In the example shown in Figs. 3 and 4 the parts which are analogous to the parts in Figs. 1 and 2 are numbered or shown with the same identification marks.

The only difference, however, between Fig. 2 on the one side and 3 and 4 on the other side is that in Fig. 2 the channels $i^3$ and $i^4$ open into the throttling space $i^2$ while in Figs. 3 and 4 channels $i^3$ and $i^4$ directly connect the air chamber $i$ with the combustion chamber $c$. In Fig. 4 is shown a further channel $i^5$ which connects the air chamber $i$ with the combustion chamber $c$ but points downwards towards the piston. In Figs. 3 and 4 reference character $i^2$ indicates a restricted orifice of no appreciable length and which may be defined as a throttling place in contra-distinction to the relatively elongated throttling passage or space $i^2$ of Figs. 1 and 2.

The contents of the air chamber $i$ which are blown out of the air chamber on account of the high pressure therein through the throttling space or place $i^2$ flow directly toward the nozzle $h$ and are split on this point and form two streams flowing in opposite directions. In Figs. 3 and 4, those contents which do not flow out through the throttling place $i^2$ flow through the channels $i^3$ and $i^4$ into the main combustion chamber $c$. The streams of mixture coming out of channels $i^3$ and $i^4$, in Figs. 1 to 4, inclusive, are led along the walls of the combustion chamber $c$ in opposite directions and meet there the other streams split by the nozzle $h$ and mix there partly or go past each other. In Fig. 4, however, the flow coming out of the air chamber $i$ has a further exit through the channel $i^5$ downwards towards the piston head. In Fig. 3 the outer ends of the passages $i^3$ and $i^4$ are restricted and provide throttling places or openings.

Looked at purely externally the process which takes place here is somewhat similar to known engines by Steinbecker and other inventors. The vast difference, however, existing between this application and the Steinbecker process is that in the case of my application a large and essential portion of the fuel exploded in the air chamber is used for the actual work on the piston and the other part is used to create and direct a willed turbulence and movement in willed directions in the combustion chamber.

The Steinbecker inventions and others do not create a high pressure and energy chamber to be used as an active worker on the piston nor do they show the intent to use the blowout energy of the air chamber in order to create or direct a willed turbulence and movement in the combustion chamber.

Having now particularly described and ascertained the nature of my said invention and in what manner the same is to be performed, I declare that what I claim is:

In an injection engine, a cylinder and a piston operating therein, a main combustion chamber of approximately heart-shape in plan overlying and opening into the cylinder area, said chamber comprising a constriction and lobes at opposite sides thereof, an air storage chamber opening into the combustion chamber at one side thereof and substantially normal to the cylinder axis, and a fuel injection nozzle opening into the combustion chamber at the opposite side and between the lobes thereof, the nozzle being disposed to inject fuel substantially normal to the cylinder axis and toward the storage chamber opening, said storage chamber being provided with openings disposed to eject the contents of the storage chamber laterally thereof into the combustion chamber and substantially in the plane thereof.

FRANZ LANG.